United States Patent
Bradbury et al.

(10) Patent No.: US 10,445,066 B2
(45) Date of Patent: *Oct. 15, 2019

(54) STOCHASTIC ROUNDING FLOATING-POINT MULTIPLY INSTRUCTION USING ENTROPY FROM A REGISTER

(71) Applicant: International Business Machines Corporation, Armonk, NY (US)

(72) Inventors: Jonathan D. Bradbury, Poughkeepsie, NY (US); Steven R. Carlough, Poughkeepsie, NY (US); Brian R. Prasky, Campbell Hall, NY (US); Eric M. Schwarz, Gardiner, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,462

(22) Filed: Feb. 14, 2017

(65) Prior Publication Data
US 2017/0220343 A1 Aug. 3, 2017

Related U.S. Application Data

(63) Continuation of application No. 15/009,372, filed on Jan. 28, 2016.

(51) Int. Cl.
*G06F 7/487* (2006.01)
*G06F 9/30* (2018.01)
(Continued)

(52) U.S. Cl.
CPC ........ *G06F 7/4876* (2013.01); *G06F 7/49947* (2013.01); *G06F 9/30014* (2013.01); *G06F 9/30043* (2013.01); *G06F 17/18* (2013.01)

(58) Field of Classification Search
CPC .................................................... G06F 9/3001
See application file for complete search history.

(56) References Cited

U.S. PATENT DOCUMENTS

| 8,667,042 B2 * | 3/2014 | Wiedemeier | G06F 7/483 708/501 |
| 2003/0101207 A1 * | 5/2003 | Dhong | G06F 7/485 708/505 |

(Continued)

OTHER PUBLICATIONS

Bradbury et al., "Stochastic Rounding Floating-Point Add Instruction Using Entropy From a Register," U.S. Appl. No. 15/009,397, filed Jan. 28, 2016.

(Continued)

*Primary Examiner* — Michael J Metzger
(74) *Attorney, Agent, or Firm* — Cantor Colburn LLP; Steven Chiu

(57) ABSTRACT

Embodiments are directed to a computer implemented method for executing machine instructions in a central processing unit. The method includes obtaining, by a processor system, a machine instruction for execution, the machine instruction being defined for computer execution according to a computer architecture. The method further includes executing the machine instruction, wherein the executing includes loading a multiplicand into a multiplicand register, and loading a multiplier into a multiplier register. The executing further generates an intermediate product having least significant bits by multiplying the multiplicand and the multiplier. The executing further includes generating a rounded product by performing a probability analysis on the least significant bits of the intermediate product, and initiating a rounding operation on the intermediate product to produce the rounded product based at least in part on the probability analysis.

7 Claims, 10 Drawing Sheets

(51) Int. Cl.
*G06F 17/18* (2006.01)
*G06F 7/499* (2006.01)

(56) References Cited

U.S. PATENT DOCUMENTS

| | | | | |
|---|---|---|---|---|
| 2004/0078401 A1* | 4/2004 | Hilton | ............... | G06F 7/48 |
| | | | | 708/252 |
| 2004/0267857 A1* | 12/2004 | Abel | ............... | G06F 7/5338 |
| | | | | 708/524 |
| 2008/0215659 A1* | 9/2008 | Cowlishaw | ............... | G06F 7/483 |
| | | | | 708/497 |
| 2011/0040815 A1* | 2/2011 | Penton | ............... | G06F 7/483 |
| | | | | 708/205 |
| 2012/0124117 A1* | 5/2012 | Yu | ............... | G06F 7/483 |
| | | | | 708/205 |
| 2016/0004507 A1* | 1/2016 | Elmer | ............... | G06F 7/49957 |
| | | | | 708/523 |

OTHER PUBLICATIONS

Bradbury et al., "Stochastic Rounding Floating-Point Add Instruction Using Entropy From a Register," U.S. Appl. No. 15/432,551, filed Feb. 14, 2017.
Bradbury et al., "Stochastic Rounding Floating-Point Multiply Instruction Using Entropy From a Register," U.S. Appl. No. 15/009,372, filed Jan. 28, 2016.
List of IBM Patents or Patent Applications Treated As Related—Date Filed: Feb. 14, 2017; 2 page.

* cited by examiner

| REGISTER | BITS AVAILABLE |
|---|---|
| CONDITION REGISTER (CR) | 0-31 |
| LINK REGISTER (LR) | 0-31 |
| COUNT REGISTER (CTR) | 0-31 |
| GENERAL PURPOSE REGISTERS 00-31 (GPR) | 0-31 FOR EACH REGISTER |
| MULTIPLY-QUOTIENT REGISTER (MQ) | 0-31 |
| FIXED-POINT EXCEPTION REGISTER (XER) | 0-31 |
| FLOATING-POINT REGISTERS 00-31 (FPR) | 0-63 FOR EACH REGISTER |
| FLOATING POINT STATUS AND CONTROL REGISTER (FPSCR) | 0-31 |

FLOATING-POINT BINARY STORAGE FORMATS

| IEEE SHORT REAL: 32 BITS | 1 BIT FOR THE SIGN, 8 BITS FOR THE EXPONENT, AND 23 BITS FOR THE MANTISSA. ALSO CALLED *SINGLE PRECISION (P)*. |
|---|---|
| IEEE LONG REAL: 64 BITS | 1 BIT FOR THE SIGN, 11 BITS FOR THE EXPONENT, AND 52 BITS FOR THE MANTISSA. ALSO CALLED *DOUBLE PRECISION (DP)*. |

IEEE SHORT REAL

FP MULTIPLY AND ROUND STOCHASTIC

VFMRS   V1, V2, V3, V4, M5, M6                                    [VRR-e]
| 'OP' | V1 | V2 | V3 | M6 | M5 | V4 | RXB | 'OP' |
| 0 | 8 | 12 | 16 | 20 | 24 | 28 | 32 | 36 | 40 | 47 |

V1[i] = V2[i] * V3[i] (ROUNDED USING ENTROPY FROM V4[i])

FIG. 10

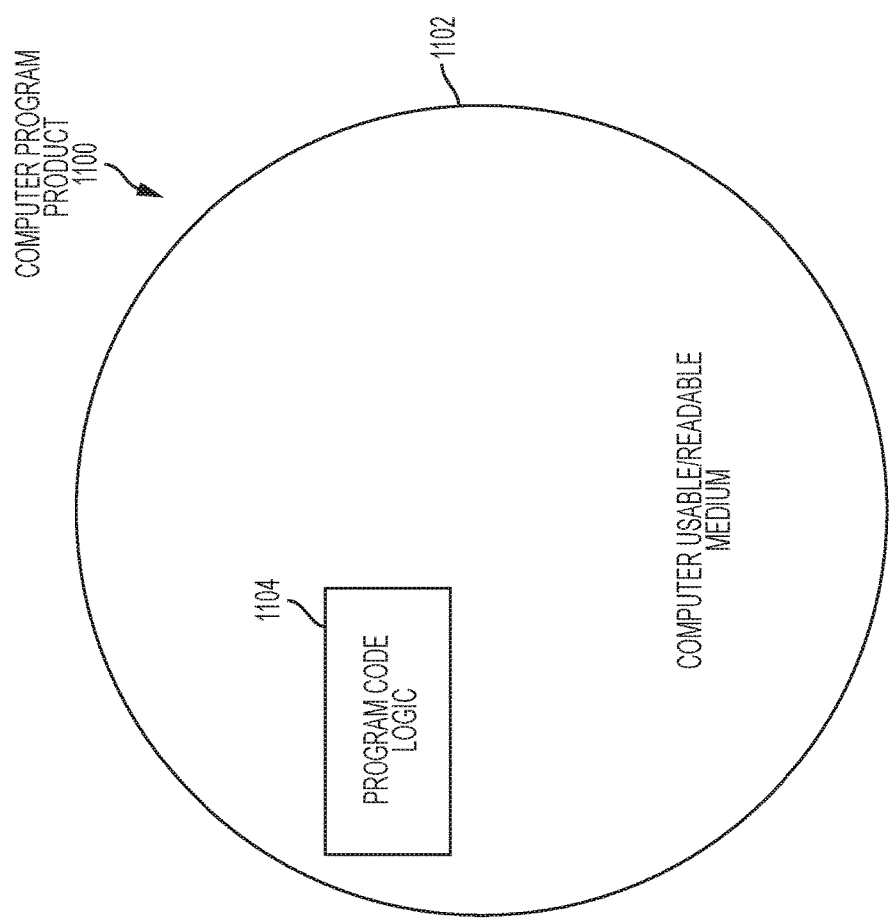

STOCHASTIC ROUNDING FLOATING-POINT MULTIPLY INSTRUCTION USING ENTROPY FROM A REGISTER

DOMESTIC PRIORITY

This application is a continuation of U.S. application Ser. No. 15/009,372, titled "STOCHASTIC ROUNDING FLOATING-POINT MULTIPLY INSTRUCTION USING ENTROPY FROM A REGISTER" filed Jan. 28, 2016, the contents of which are incorporated by reference herein in its entirety.

BACKGROUND

The present disclosure relates in general to executing computer instructions that access, read, write and/or multiply stored data. More specifically, the present disclosure relates to executing floating-point multiply/divide instructions that perform stochastic rounding using entropy from a register.

Although integers provide an exact representation for numeric values, they suffer from two major drawbacks, namely the inability to represent fractional values and a limited dynamic range. Accordingly, as integer machines computer are capable of representing real numbers (i.e., numbers that can contain a fractional part) only by using complex codes. Over the years, a variety of codes have been used in computers, but the most commonly encountered representation is that defined by the IEEE 754 Floating-Point Standard. In computing, floating-point is a trade-off between range and precision. A number is, in general, represented in floating-point approximately to a fixed number of significant digits (i.e., the significand) and scaled using an exponent. The base for the scaling is normally two, ten or sixteen. A number that can be represented exactly is of the following form, significand×base$^{exponent}$. For example, using base-10, $1.2345=12345\times10^{-4}$.

The term floating-point is derived from the fact that there is no fixed number of digits before and after the decimal point. In other words, the decimal point can float. A code representation in which the number of digits before and after the decimal point is set is known as a fixed-point representation. Because of the importance of floating point mathematics in computer workloads, many microprocessors come with dedicated hardware called a floating point unit (FPU) designed specifically for the purposes of computing floating point operation. FPUs are also called math coprocessors and numeric coprocessors.

Most floating-point numbers that a computer can represent are approximations due to a variety of factors. For example, irrational numbers, such as π or √2 or non-terminating rational numbers, must be approximated. The number of digits (or bits) of precision also limits the set of rational numbers that can be represented exactly. For example, the number 123456789 cannot be exactly represented if only eight decimal digits of precision are available. Providing approximations of floating-point numbers may also be done to obtain a value that is easier to report and communicate than the original. One of the challenges in programming with floating-point values is ensuring that the approximations lead to reasonable results. If the programmer is not careful, small discrepancies in the approximations can accumulate over time to the point where the final results become meaningless.

Floating-point numbers are approximated in computers using rounding. Rounding a numerical value means replacing it by another value that is approximately equal but has a shorter, simpler representation. For example, in base-10, replacing 23.4476 with 23.45, or the square root of 2 with 1.414. Rounding exact numbers will introduce some round-off error in the reported result. Rounding is almost unavoidable when reporting many computations, particularly when dividing two numbers in integer or fixed-point arithmetic, when computing mathematical functions such as square roots, or when using a floating point representation with a fixed number of significant digits. In a sequence of calculations performed over time, these rounding errors generally accumulate.

Accordingly, it would be beneficial to provide a simple and efficient system and methodology that mitigates rounding errors over time when performing repeated arithmetic operations such as multiplication or division using floating-point numbers in a computer.

SUMMARY

Embodiments are directed to a computer system for executing machine instructions in a central processing unit. The computer system includes a memory and a processor system communicatively coupled to the memory, wherein the processor system is configured to perform a method. The method includes obtaining, by the processor system, a machine instruction for execution, the machine instruction being defined for computer execution according to a computer architecture. The method further includes executing the machine instruction, wherein the executing includes loading a multiplicand into a multiplicand register, and loading a multiplier into a multiplier register. The executing further generates an intermediate product having least significant bits by multiplying the multiplicand and the multiplier. The executing further includes generating a rounded product by performing a probability analysis on the least significant bits of the intermediate product, and initiating a rounding operation on the intermediate product to produce the rounded product based at least in part on the probability analysis.

Embodiments are further directed to a computer implemented method for executing machine instructions in a central processing unit. The method includes obtaining, by a processor system, a machine instruction for execution, the machine instruction being defined for computer execution according to a computer architecture. The method further includes executing the machine instruction, wherein the executing includes loading a multiplicand into a multiplicand register, and loading a multiplier into a multiplier register. The executing further generates an intermediate product having least significant bits by multiplying the multiplicand and the multiplier. The executing further includes generating a rounded product by performing a probability analysis on the least significant bits of the intermediate product, and initiating a rounding operation on the intermediate product to produce the rounded product based at least in part on the probability analysis.

Embodiments are further directed to a computer program product for executing machine instructions in a central processing unit. The computer program product includes a computer readable storage medium having program instructions embodied therewith, wherein the computer readable storage medium is not a transitory signal per se. The program instructions are readable by a processor system to cause the processor system to perform a method. The method includes obtaining, by the processor system, a machine instruction for execution, the machine instruction being defined for computer execution according to a computer architecture. The method further includes executing the machine instruction, wherein the executing includes loading a multiplicand into a multiplicand register, and loading a multiplier into a multiplier register. The executing further generates an intermediate product having least significant bits by multiplying the multiplicand and the multiplier. The executing further includes generating a rounded product by performing a probability analysis on the least significant bits of the intermediate product, and initiating a rounding operation on the intermediate product to produce the rounded product based at least in part on the probability analysis.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 10 depicts an example instruction code format for performing a floating-point multiply and round stochastic (FMRS) instruction according to one or more embodiments of the present disclosure; and FIG. 11 depicts a computer program product according to one or more embodiments.

DETAILED DESCRIPTION

It is understood in advance that although this disclosure includes references to various computer programming languages (e.g., C, C++, C#, Java, etc.) and instruction set architectures (e.g., z Architecture, Power ISA, etc.), implementation of the teachings recited herein are not limited to any particular computing environment. Rather, embodiments of the present disclosure are capable of being implemented in conjunction with any other type of computing environment now known or later developed.

Known machine learning applications and neural network applications are being designed with stochastic rounding. Traditional rounding methods are problematic for such applications. For instance, if it is desired to round the cost of a product to the nearest 5 cents to eliminate the use of pennies, and 10,000 products are sold at the cost of $9.98 cents, the seller will always receive the benefit of the rounding. In systems that perform many operations that result in the exact same result prior to rounding, there will be a tendency for one side to always benefit. Stochastic rounding is a probabilistic method wherein the direction in which the result is perturbed is based on how close the result is to the possible outcomes. The present disclosure provides a machine instruction, referred to herein as a floating-point multiply and round stochastic (FMRS) instruction that rounds stochastically based on a probabilistic analysis of the least significant bits on which the rounding is to be based. The probabilistic analysis is based on whether random entropy (e.g., a random number) added to the least significant bits on which the rounding is to be based results in a carry. Using the disclosed FMRS instruction, the accumulation of rounding errors over time is mitigated. When utilizing the disclosed FMRS instruction to repeatedly multiply/divide a large number of items, statistically the answer will be closer to the true result when the disclosed rounding methodology is performed. Execution of the disclosed FMRS instruction may be carried out by hardware, software or a combination of software and hardware.

Figure 1:
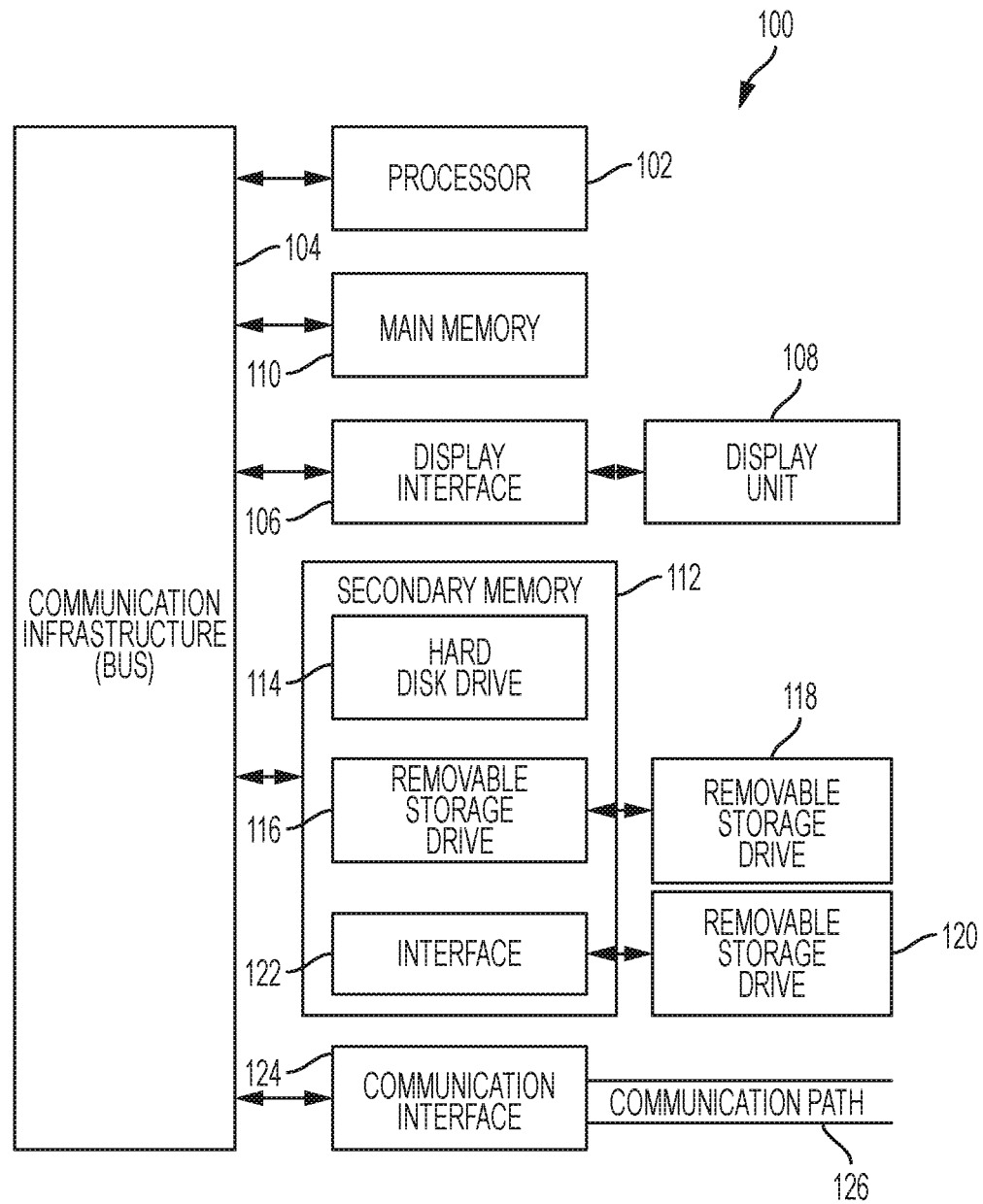
FIG. 1 depicts an exemplary computer system capable of implementing one or more embodiments of the present disclosure.

Turning now to a more detailed description of the present disclosure, FIG. 1 illustrates a high level block diagram showing an example of a computer-based system 100 useful for implementing one or more embodiments. Although one exemplary computer system 100 is shown, computer system 100 includes a communication path 126, which connects computer system 100 to additional systems and may include one or more wide area networks (WANs) and/or local area networks (LANs) such as the internet, intranet(s), and/or wireless communication network(s). Computer system 100 and additional system are in communication via communication path 126, e.g., to communicate data between them.

Computer system 100 includes one or more processors, such as processor 102. Processor 102 is connected to a communication infrastructure 104 (e.g., a communications bus, cross-over bar, or network). Computer system 100 can include a display interface 106 that forwards graphics, text, and other data from communication infrastructure 104 (or from a frame buffer not shown) for display on a display unit 108. Computer system 100 also includes a main memory 110, preferably random access memory (RAM), and may also include a secondary memory 112. Secondary memory 112 may include, for example, a hard disk drive 114 and/or a removable storage drive 116, representing, for example, a floppy disk drive, a magnetic tape drive, or an optical disk drive. Removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, removable storage unit 118 includes a computer readable medium having stored therein computer software and/or data.

In alternative embodiments, secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to computer system 100.

Computer system 100 may also include a communications interface 124. Communications interface 124 allows software and data to be transferred between the computer system and external devices. Examples of communications interface 124 may include a modem, a network interface (such as an Ethernet card), a communications port, or a PCM-CIA slot and card, etcetera. Software and data transferred via communications interface 124 are in the form of signals which may be, for example, electronic, electromagnetic, optical, or other signals capable of being received by communications interface 124. These signals are provided to communications interface 124 via communication path (i.e., channel) 126. Communication path 126 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 110 and secondary memory 112, removable storage drive 116, and a hard disk installed in hard disk drive 114. Computer programs (also called computer control logic) are stored in main memory 110 and/or secondary memory 112. Computer programs may also be received via communications interface 124. Such computer programs, when run, enable the computer system to perform the features of the present disclosure as discussed herein. In particular, the computer programs, when run, enable processor 102 to perform the features of the computer system. Accordingly, such computer programs represent controllers of the computer system.

Computer system 100, and particularly processor 102, may be implemented according to the logical structure of a system z/Architecture ISA (instruction set architecture) or a Power ISA™ or any other architecture that supports floating-point arithmetic operations. Additional details of the overall operation of the z/Architecture in general are disclosed in the following publications: *z/Architecture Principles of Operation*, Seventh Edition (February, 2008); and *z/Architecture Principles of Operation*, Tenth Edition (September 2012). Additional details of the Power ISA™ architecture are disclosed in *Power ISA Version* 2.07 (May 10, 2013). Additional Power ISA documents are available via the World Wide Web at www.power.org. The entire disclosure of each of the above-referenced publications is incorporated by reference herein in its entirety.

Modern computer processor architectures typically rely on multiple functional units to execute instructions from a computer program. An instruction or issue unit typically retrieves instructions and dispatches, or issues, the instructions to one or more execution units to handle the instructions. Accordingly, processor 102 may include, for example, a load/store unit (not shown) that handles retrieval and storage of data from and to a memory (e.g., main memory 110, secondary memory 112, etc.), and a fixed point execution unit, or arithmetic logic unit (ALU), to handle logical and arithmetic operations.

Figure 2:
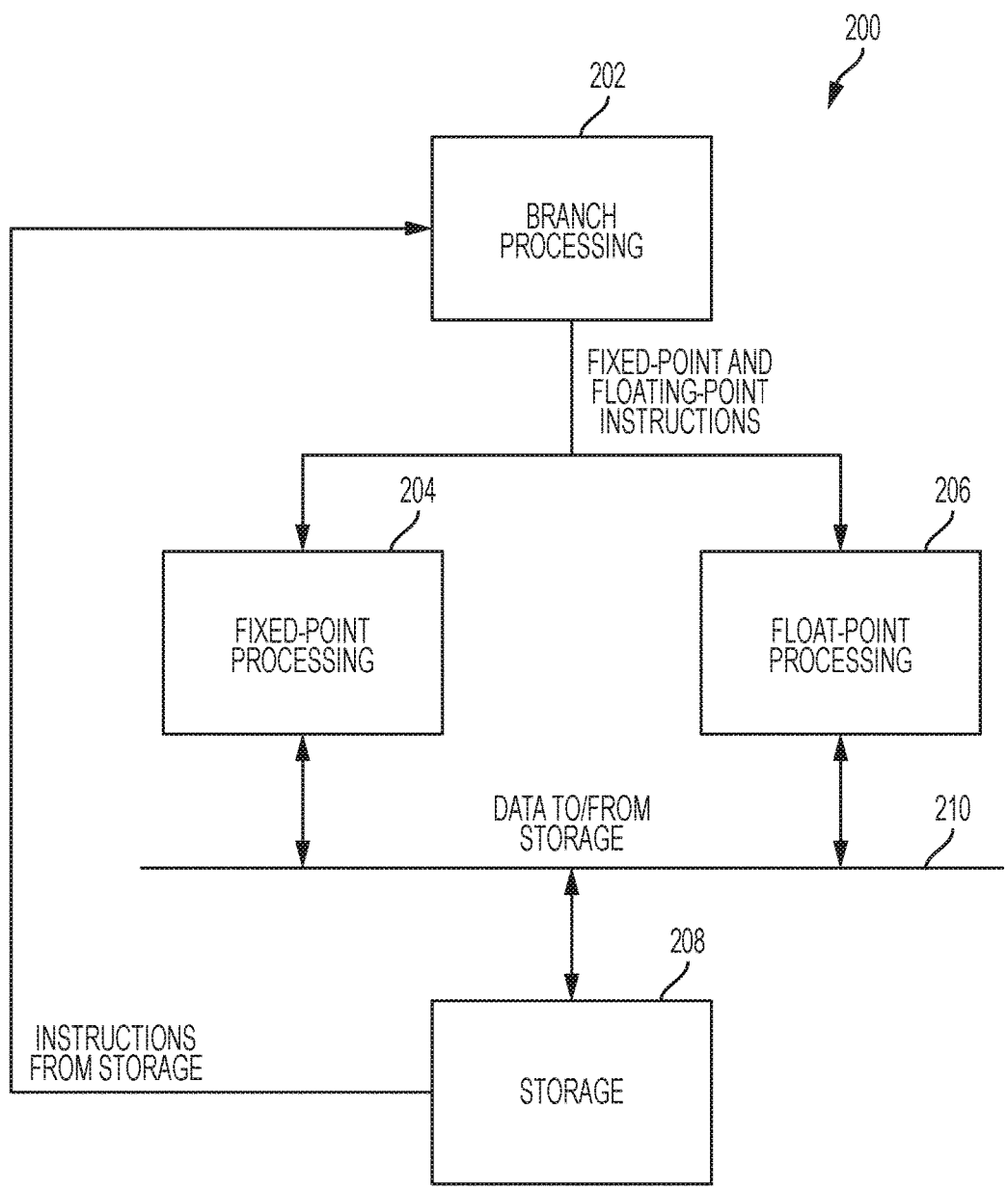
FIG. 2 depicts a logical instruction processing model of an exemplary computer system capable of implementing one or more embodiments of the present disclosure.

Whereas earlier processor architectures utilized a single ALU to handle all logical and arithmetic operations, demands for increased performance necessitated the development of superscalar architectures that utilize multiple execution units to handle different types of computations. Such architectures enable multiple instructions to be routed to different execution units and executed in parallel, thereby increasing overall instruction throughput. One of the most common types of operations that can be partitioned into a separate execution unit is floating point arithmetic, which involves performing mathematical computations (e.g., addition, subtraction, multiplication, division, etc.) using one or more floating point values. FIG. 2 depicts a logical instruction processing model 200 of computer system 100 (shown in FIG. 1) and processor 102 (shown in FIG. 1), wherein floating-point arithmetic operations have been partitioned into a separate execution unit (e.g., floating-point processing module 206).

Figures 4, 5:
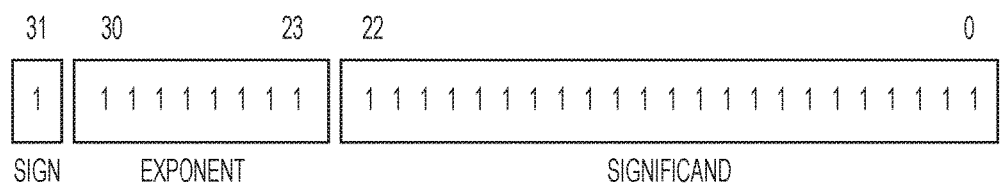
FIG. 4 depicts a diagram illustrating examples of floating-point binary storage formats capable of being used in connection with one or more embodiments of the present disclosure.
FIG. 5 depicts diagrams illustrating an example of floating-point binary storage format capable of being used in connection with one or more embodiments of the present disclosure.

FIG. 4 and FIG. 5 depict diagrams 400, 500 illustrating examples of floating-point binary storage formats capable of being used in connection with one or more embodiments of the present disclosure. Two common floating-point binary storage formats are shown in diagram 400. Diagram 500 illustrates the IEEE Short Real format. A number is, in general, represented in a floating-point format approximately to a fixed number of significant digits (i.e., the significand or mantissa) and scaled using an exponent. The base for the scaling is normally two, ten or sixteen. A number that can be represented exactly is of the following form, significand$\times$ base$^{exponent}$. For example, using base-10, $1.2345=12345\times10^{-4}$. As shown by diagram 500, the sign of a binary floating-point number is represented by a single bit (bit 31). A 1 bit indicates a negative number, and a 0 bit indicates a positive number. The exponent is represented in diagram 500 from bit 23 to bit 30. The significand is represented in diagram 500 from bit 0 to bit 22.

Before a floating-point binary number can be stored correctly, its significant must be normalized. The process is basically the same as when normalizing a floating-point decimal number. For example, decimal 1234.567 is normalized as $1.234567\times10^3$ by moving the decimal point so that only one digit appears before the decimal. The exponent expresses the number of positions the decimal point was moved left (positive exponent) or moved right (negative exponent). Similarly, the floating-point binary value 1101.101 is normalized as $1.101101\times2^3$ by moving the decimal point 3 positions to the left, and multiplying by $2^3$. In a normalized significand, the digit 1 always appears to the left of the decimal point. However, the leading 1 is omitted from the significand in the IEEE storage format because it is redundant.

Returning again to FIG. 2, in logical instruction processing model 200 floating-point arithmetic operations have been partitioned into a separate execution unit, namely floating-point processing module 206. In one or more embodiments, processor 102 (shown in FIG. 1) implements processing model 200 according to the PowerISA architecture. Processing model 200 includes a branch processing module 202, a fixed-point processing module 204, floating-point processing module 206 and a storage 208, configured and arranged as shown. Processing model 200 includes the sequencing and processing controls for instruction fetch, instruction execution and interrupt action. Processing model 200 implements the instruction set, storage model and other facilities defined in the PowerISA architectures, and can execute branch instructions, fixed-point instructions and floating-point instructions.

Processing model 200 begins at branch processing module 202, which branches to either fixed-point processing module 204 or floating-point processing module 206. Fixed-point processing module 204 and floating-point processing module 206 send and receive data from storage 208 over a bus line 210. Storage 208 also sends instructions directly to branch processing module 202. Floating-point processing module 206 may include separate exponent and significand paths. A series of adders and/or multipliers may be incorporated into the exponent path to calculate the exponent of a floating point result. A combination of multiplier, alignment, normalization, rounding and adder circuitry may be incorporated into the significand path to calculate the significand of the floating point result.

Figure 3:
FIG. 3 depicts a table showing exemplary registers that may be provided in a user instruction set architecture of an exemplary computer system capable of implementing one or more embodiments of the present disclosure.

In one or more embodiments, fixed-point processing module 204 functions in tandem with floating-point processing module 206 using 32-bit word-aligned instructions. Fixed-point processing module 204 and floating-point processing module 206 provide byte, half-word and word operand fetches and stores for fixed-point operations, and provide word and double-word operand fetches and stores for floating-point operations. These fetches and stores can occur between storage 208 and a set of 32 general-purpose registers, and between storage 208 and a set of 32 floating-point registers. FIG. 3 depicts a table 300 showing exemplary registers that may be provided in a user instruction set architecture of processing model 200.

Figure 6:
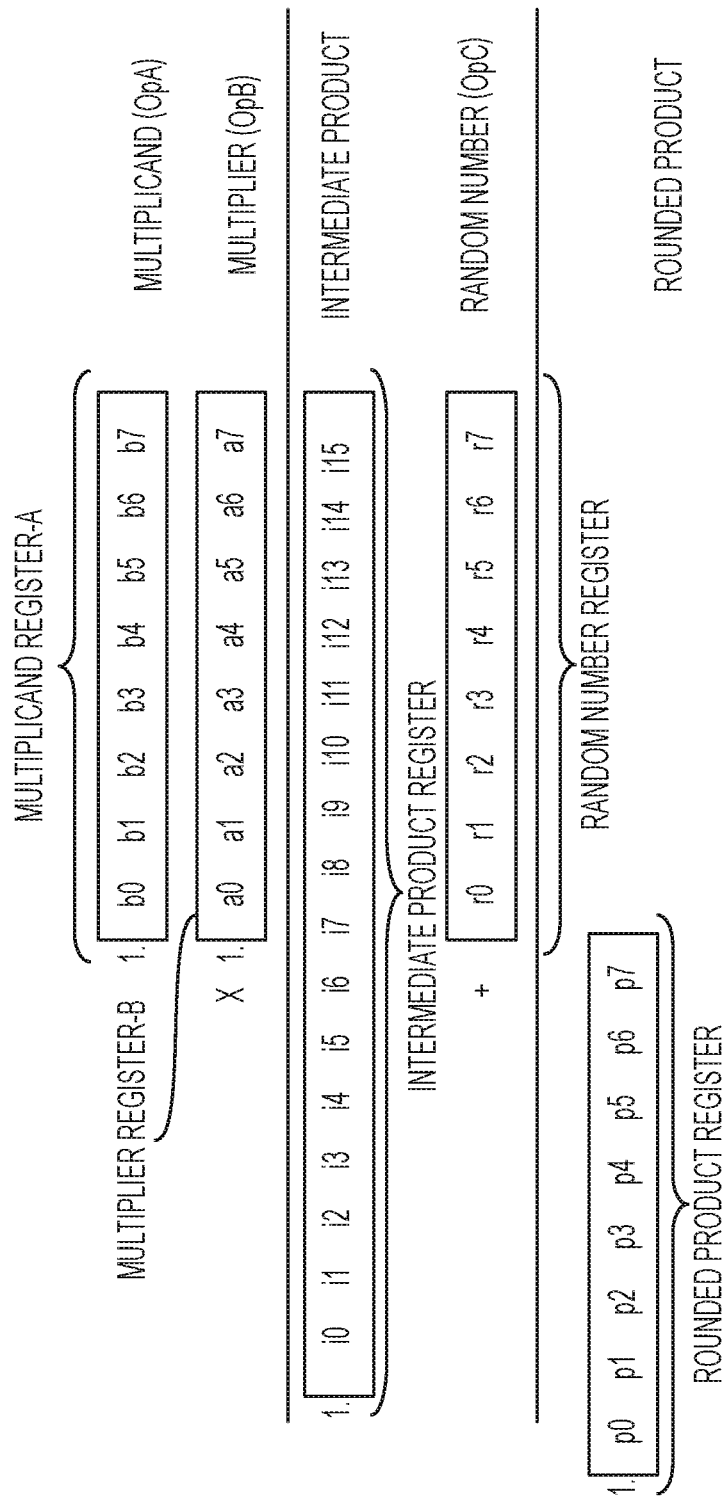
FIG. 6 depicts a diagram illustrating operation of a stochastically rounded floating-point multiplication instruction according to one or more embodiments of the present disclosure.
Figure 7:
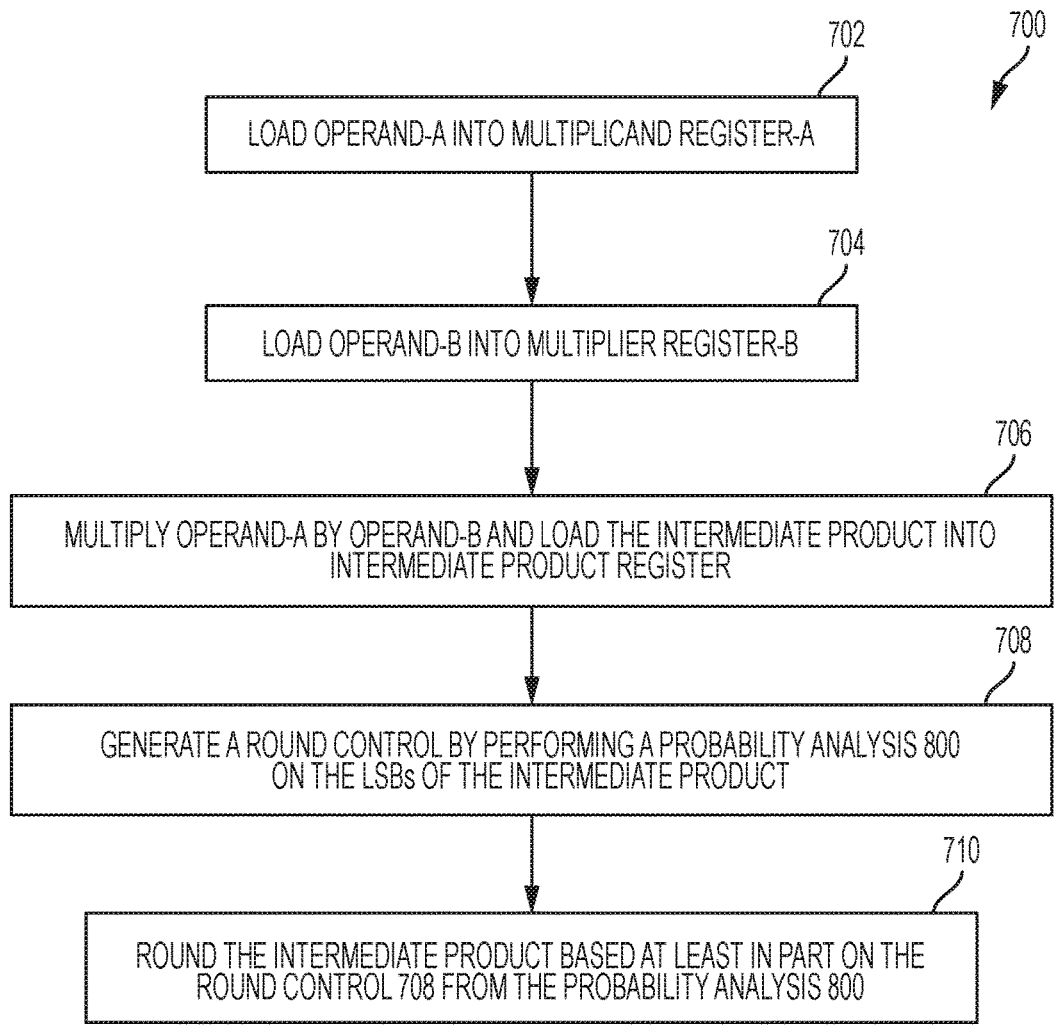
FIG. 7 depicts a flow diagram illustrating a methodology according to one or more embodiments of the present disclosure.
Figure 8:
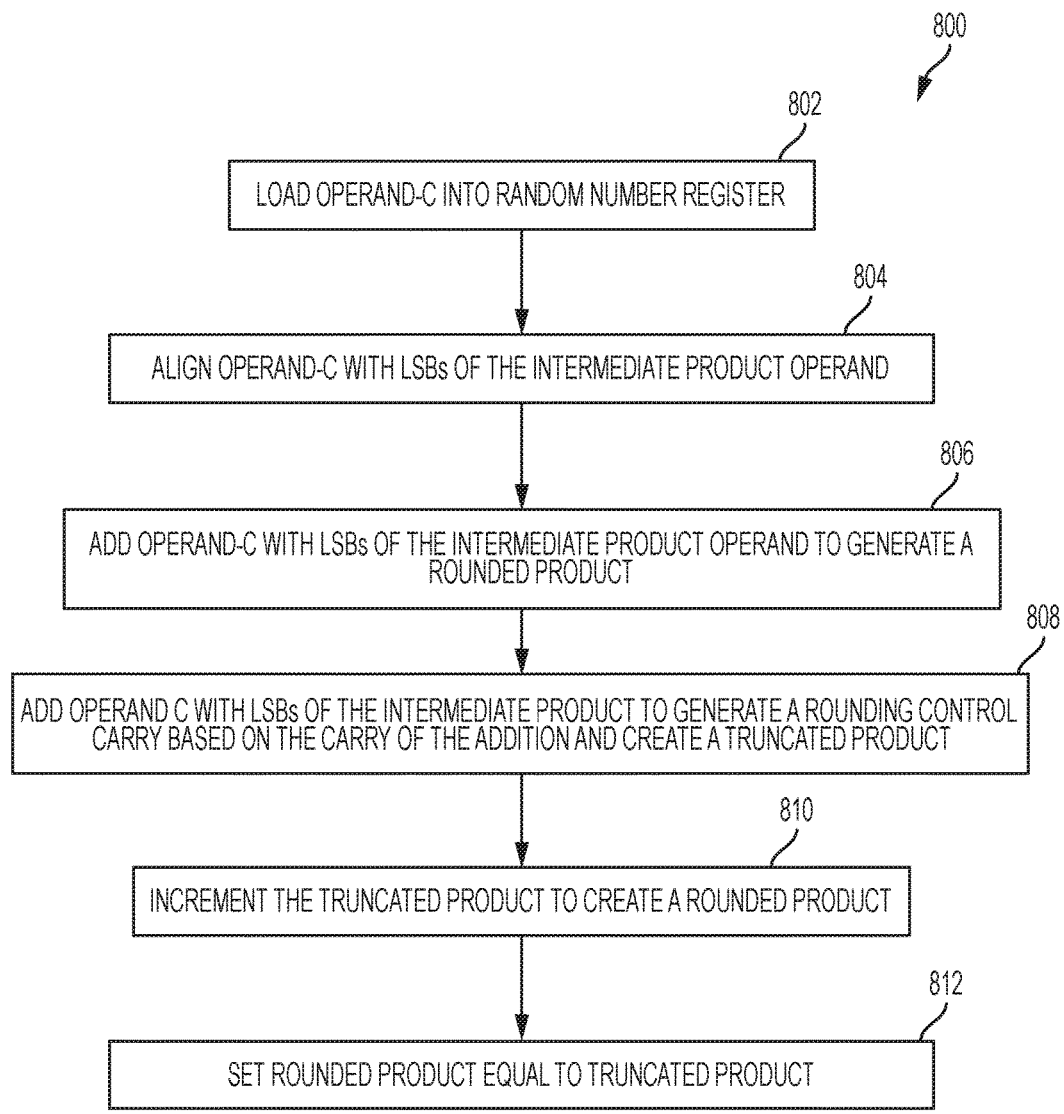
FIG. 8 depicts a flow diagram illustrating a probability analysis methodology according to one or more embodiments of the present disclosure.

FIG. 6 depicts a diagram illustrating the execution of a stochastically rounded floating-point multiply instruction according to one or more embodiments of the present disclosure. More specifically, FIG. 6 depicts the multiplication and rounding of the significands of two floating-point numbers. FIG. 7 depicts a flow diagram illustrating an execution methodology of the disclosed stochastically rounded floating-point multiplication instruction. FIG. 8 depicts a flow diagram illustrating a probability analysis methodology 800 that may be used with execution methodology 700 (shown in FIG. 7) according to one or more embodiments of the present disclosure. The execution of the disclosed stochastically rounded floating-point multiplication instruction will now be described with reference to the methodologies illustrated in FIGS. 6, 7 and 8. It is noted, however, that sequence or order of operations implied by the descriptions herein are provided for ease of explanation and illustration. It will be understood by persons skilled in the relevant art that, in application, the actual order in which stored characters are accessed, read, loaded, written or stored will vary depending on number of factors, including but not limited to, the actual application, the chosen computer architecture and whether the operations are performed in serial or in parallel.

Referring now to FIGS. 6 and 7, a multiplicand is loaded as an operand-A (OpA) into 8-bits of a multiplicand register-A (block 702). A multiplier is loaded as an operand-B (OpB) into 8-bits of a multiplier register-B (block 704). OpA is then multiplied by OpB and the resulting intermediate product is loaded into an intermediate product register or a memory (not shown) (block 706). Only the most significant bits of the intermediate product are maintained. Accordingly, any bits beyond the least significant bit (LSB) i7 of the intermediate product are dropped off, and the LSB i7 is rounded, resulting in rounded product (p0, p1, p2, p3, p4, p5, p6, p7) (block 708).

Although all rounding introduces some error, rounding floating-point numbers without benefit of the present disclosure introduces non-trivial errors that accumulate over time. Examples include rounding toward zero, which simply truncate the extra digits. Although simple, each implementation of this method introduces large errors as well as a bias toward zero when dealing with mainly positive or mainly negative numbers. Another known rounding approach is rounding half away from zero, which increases the last remaining digit if the truncated fraction is greater than or equal to half the base. Although the individual errors from each implementation of this method are relatively smaller, the errors still accumulate over time, and it also introduces a bias away from zero. Another known rounding approach is rounding half to even, also known as banker's rounding. In banker's rounding, if the truncated fraction is greater than half the base, the last remaining digit is increased. If the truncated fraction is equal to half the base, the digit is increased only if that produces an even result. Although the individual errors from each implementation of banker's rounding are relatively smaller, the errors still accumulate over time.

The accumulation of rounding errors over time is mitigated according to the present disclosure by utilizing a probability analysis to round the intermediate product register (blocks 708, 710). Referring now to FIGS. 6 and 8, according to the disclosed probability analysis, a random number is loaded as an operand-C(OpC) into 8-bits of a random number register (block 802). OpC is aligned to overlap with the LSBs of the intermediate product register (i.e., i8, i9, i10, i11, i12, i13, i14, i15) (block 804). OpC is added to the LSBs of the intermediate product register (block 806), and the most significant bits of the result are loaded into the truncated product register. A determination is made as to whether the addition of OpC and the LSBs of the intermediate product register results in a carry into the LSB p7 of the truncated product register (block 808). If the addition of OpC and the LSBs of the intermediate product results in a carry, the truncated product is incremented (block 810). If the addition of OpC and the LSBs of the intermediate product does not result in a carry, the truncated product is used as the final stochastically rounded result (block 812). Accordingly, when multiplying the same OpA and OpB values repeatedly, whether or not the truncated product is incremented or not changed is based on the disclosed probability analysis performed on the LSBs of the intermediate product, which is in contrast to the static and unchanging rounding rules of the prior art. Because of the use of a random variable to make a probabilistic rounding determination, methodology 800 may be described as stochastic. When utilizing the disclosed FMRS instruction to multiply a large number of items, statistically the answer will be closer to the true result when the disclosed rounding methodology is performed. Execution of the disclosed FMRS instruction may be carried out by hardware, software or a combination of software and hardware.

It is known in the art that rounding may cause a carry out resulting in a new most significant digits of the product. This requires an additional shift and round operation. Known art describes how these cases are handled in special hardware and is an independent topic not further discussed in the present disclosure.

Figure 9:
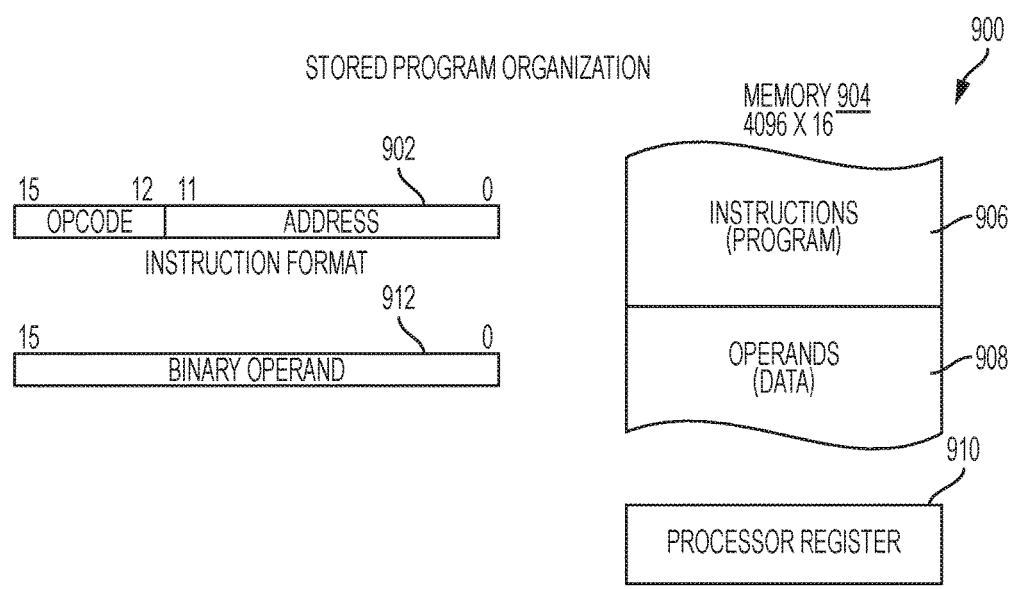
FIG. 9 depicts a general example of a stored program organization scheme and instruction code format capable of implementing one or more embodiments of the present disclosure.

FIG. 9 depicts a basic example of a general stored program organization scheme 900 and instruction code format 902 capable of implementing one or more embodiments of the floating-point multiply and round stochastic (FMRS) instruction of the present disclosure. The name "FMRS" is a shorthand notation for "floating-point multiply and round stochastic." The selection of the name for this instruction methodology is not critical. Any other name may be selected without departing from the scope of the present disclosure. Stored program organization scheme 900 includes a memory 904, instruction memory locations 906, operand memory locations 908 and a processor register 910, configured and arranged as shown. Computer instructions in the form of instruction codes 902 are typically stored in consecutive locations of instruction memory 906 and executed sequentially at processor register 910. An instruction code is generally a group of bits that instruct the computer to perform a specific operation. Instruction codes may have a variety of formats. Instruction code format 902 includes an operation code (op code) field and an address field. The operation code is the portion of a machine language instruction that specifies the operation to be performed. The address field specifies operands, registers or memory words. The address field is often used not as an address but as the actual operand (e.g., binary operand 912). When the address field of an instruction code specifies an operand, the instruction is said to have an immediate operand. The effective address under this scenario may be the address of the operand in a computational-type instruction or the target address in a branch-type instruction.

FIG. 10 depicts an example of an instruction code format for a FMRS instruction according to one or more embodiments of the present disclosure. The FMRS instruction may be implemented according to a system z/Architecture ISA (instruction set architecture) or a Power ISA™ or any other architecture that supports floating-point arithmetic operations. In one or more embodiments, the disclosed FMRS instruction is a vector instruction, which is part of a vector facility. The vector facility provides, for instance, fixed sized vectors ranging from one to sixteen elements. Each vector includes data which is operated on by vector instructions defined in the facility. In one or more embodiments, if a vector is made up of multiple elements, then each element is processed in parallel with the other elements. Instruction completion does not occur until processing of all the elements is complete. In other embodiments, the elements are processed partially in parallel and/or sequentially.

Although the example FMRS instruction shown in FIG. 10 specifies vector registers to be used in performing various operations, depending on the architecture of the central processing unit, various types of registers may be used including, for instance, general purpose registers, special purpose registers, floating point registers and/or vector registers, as examples. In the system z/Architecture ISA, the example FMRS instruction code of FIG. 10 is encoded in a fixed 48 bit format. The leftmost field from bits zero through 7 is the primary operation code field. In the shown example, selected bits (e.g., the first two bits) of the opcode extending from bits 0 through 7 specify the length of the instruction. Further, the format of the example FMRS instruction code is a vector register-to-register operation with an extended opcode field (bits 40 through 47). Each of the vector (V) fields, along with its corresponding extension bit specified by the RXB field (bits 36 through 39), designates a vector register. In particular, for vector registers, the register containing the operand is specified using, for instance, a 4-bit field of the register field with the addition of its corresponding register extension bit (RXB) as the most significant bit.

In the example FMRS instruction shown in FIG. 10, the field from bits 8 through 11 is the $V_1$ field, which corresponds to the rounded product shown in FIG. 6 and specifies a vector register that holds the rounded product. The field from bits 12 through 15 is the $V_2$ field, which corresponds to OpA shown in FIG. 6 and specifies a vector register that holds OpA. The next field from bits 16 through 19 is the $V_3$ field, which corresponds to OpB shown in FIG. 6 and specifies a vector register that holds OpB. The fields $M_5$ and $M_6$ from bits 20 through 23 and from bits 28 through 31, respectively, are extra controls for general processing of the FMRS instruction. The slashes in the field extending from bit 24 through bit 27 identify that these bits are not used by this particular instruction code. The field from bits 32 through 35 is the $V_4$ field, which corresponds to the random number (OpC) shown in FIG. 6 and specifies a vector register that holds OpC. The field from bits 36 through 39 is the RXB field, which specifies extension bits of the vector registers. The field from bits 40 through 47 is the extended operation code (OP) field. The extended operation code field is a unique value that will identify this particular instruction.

As noted herein, the disclosed FMRS instruction and its associated execution methodologies (shown in FIGS. 8 and 9) may be a vector facility. In one or more embodiments, the vector facility may be implemented as a function call. In computer programming, a function is a self-contained software routine that performs a task. Functions can perform a large amount of processing or a small amount of processing such as adding or multiplying two numbers and deriving a result. Values are passed to the function, and values may be returned. Alternatively, the function may just perform the operation and not return a resulting value. The benefit of incorporating a function within a program is that, once written, it can be used over and over again without the programmer having to duplicate the same lines of code in the program each time that same processing is desired.

Programming languages provide a set of standard functions as well as allow programmers to define their own functions. For example, the C and C++ programming languages are built almost entirely of functions and always contain a "main" function. Functions in one program can also be called for by other programs and shared. For example, an operating system (OS) can contain more than a thousand functions to display data, print, read and write disks and perform myriad tasks. Programmers write their applications to interact with the OS using these functions. This list of functions is called the "application programming interface" (API). Functions are activated by placing a "function call" statement in the program. The function call may or may not include values (parameters) that are passed to the function. When called, the function performs the operation and returns control to the instruction following the call.

In one or more embodiments, if a vector of the disclosed FMRS instruction is made up of multiple elements, then each element may be processed using single instruction multiple data (SIMD) processing, which is a performance enhancement feature that allows one instruction to operate on multiple data items at the same time. Thus, SIMD allows what usually requires a repeated succession of instructions (e.g., a loop) to be performed in one instruction. Accordingly, for a floating-point arithmetic instruction such as the disclosed FMRS instruction, the use of SIMD processing to implement the FMRS instruction has the potential to reduce processing time by processing multiple operands in parallel.

Thus, it can be seen from the forgoing detailed description and accompanying illustrations that technical benefits of the present disclosure include systems and methodologies that execute stochastic rounding using a machine instruction, referred to herein as a floating-point multiply and round stochastic (FMRS) instruction. The disclosed FMRS instruction stochastically based on a probabilistic analysis of the least significant bits on which the rounding is to be based. The probabilistic analysis is based on whether a random number added to the least significant bits on which the rounding is to be based results in a carry. Using the disclosed FMRS instruction, the accumulation of rounding errors over time is mitigated. Execution of the disclosed FMRS instruction may be carried out by hardware, software or a combination of software and hardware.

Referring now to FIG. 11, a computer program product 1100 in accordance with an embodiment that includes a computer readable storage medium 1102 and program instructions 1104 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method for executing machine instructions in a central processing unit, the method comprising:
    obtaining, by a processor system, a floating-point multiply and round stochastic (FMRS) machine instruction for execution, the FMRS machine instruction being defined for computer execution according to a computer architecture; and
    executing the machine instruction;
    wherein the executing comprises performing a floating point multiplication operation on a first significand and a second significand by:
    loading the first significand as a first operand into a first operand register;
    loading the second significand a second operand into a second operand register;
    multiplying the first operand by the second operand to obtain an intermediate product operand having most significant bits (MSBs) and least significant bits (LSBs);
    setting the MSBs of the intermediate product operand as an initial rounded product;
    wherein the MSBs of the intermediate product operand comprise a set of most significant MSBs and at least one LSB;
    performing a probability analysis on the (LSBs) of the intermediate product operand to generate a round control value; and
    based at least in part on the round control value that results from the probability analysis, selecting and applying at least one of multiple rounding operation options to the at least one LSB of the MSBs of the initial rounded product to produce a rounded at least one LSB of the MSBs of the initial rounded product;
    wherein a final rounded product of the first significand and the second significand comprises the set of most significant MSBs of the initial rounded product;
    wherein the final rounded product further comprises the rounded at least one LSB of the MSBs of the initial rounded product.

2. The computer implemented method of claim 1, wherein the at least one of multiple rounding operation options comprises rounding the at least one LSB of the MSBs of the initial rounded product up.

3. The computer implemented method of claim 1, wherein the at least one of multiple rounding operation options comprises not adjusting the at least one LSB of the MSBs of the initial rounded product.

4. The computer implemented method of claim 1, wherein the probability analysis comprises:
    loading a third operand into a third operand register;
    aligning the third operand with the LSBs of intermediate product operand;
    adding the third operand to the LSBs of the intermediate product operand; and
    determining whether the adding of the third operand to the LSBs of the intermediate product operand resulted in a carry;
    wherein the round control value comprises the carry.

5. The computer implemented method of claim 4, wherein the third operand comprises a random number.

6. The computer implemented method of claim 4, wherein the at least one of multiple rounding operation options comprises rounding the at least one LSB of the MSBs of the initial rounded product based at least in part on the carry having a non-zero value.

7. The computer implemented method of claim 4, wherein the at least one of multiple rounding operation options comprises not adjusting the at least one LSB of the MSBs of the initial rounded product based at least in part on the carry having a zero value.

* * * * *